United States Patent
Hayashi et al.

(10) Patent No.: US 7,327,764 B2
(45) Date of Patent: Feb. 5, 2008

(54) CONTROL SYSTEM, CONTROL METHOD, AND RADIO NETWORK CONTROLLER PREFERABLY USED FOR THE SYSTEM AND METHOD

(75) Inventors: Takahiro Hayashi, Yokosuka (JP); Yoshihiro Ishikawa, Yokosuka (JP); Mikio Iwamura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 1134 days.

(21) Appl. No.: 10/285,490

(22) Filed: Nov. 1, 2002

(65) Prior Publication Data

US 2003/0086374 A1    May 8, 2003

(30) Foreign Application Priority Data

Nov. 2, 2001    (JP) ............................. 2001-338446

(51) Int. Cl.
*H04Q 7/00*    (2006.01)
(52) U.S. Cl. ................. 370/477; 370/329; 370/535
(58) Field of Classification Search ............... 370/252, 370/328, 329, 390, 493, 535, 468, 477; 455/522, 455/551, 62; 340/825.54
See application file for complete search history.

(56) References Cited

U.S. PATENT DOCUMENTS

| | | | |
|---|---|---|---|
| 5,491,837 A * | 2/1996 | Haartsen ...................... | 455/62 |
| 5,946,633 A * | 8/1999 | McAlinden ................ | 455/551 |
| 6,856,812 B1 * | 2/2005 | Budka et al. ............... | 455/522 |
| 2003/0012195 A1 | 1/2003 | Ohkubo et al. ............. | 370/390 |
| 2004/0213176 A1 * | 10/2004 | Proctor, Jr. ................. | 370/328 |

FOREIGN PATENT DOCUMENTS

| | | |
|---|---|---|
| EP | 0 986 282 | 3/2000 |
| JP | 5-347783 | 12/1993 |
| JP | 8-172405 | 7/1996 |

(Continued)

OTHER PUBLICATIONS

3GPP TS 25.211, vol. 3.7.0, XP-002902457, pp. 1-45, "3rd Generation Partnership Project; Technical Specification Group Radio Access Network; Physical Channels and Mapping of Transport Channels Onto Physical Channels (FDD)", Jun. 2001.

*Primary Examiner*—John Pezzlo
(74) *Attorney, Agent, or Firm*—Oblon, Spivak, McClelland, Maier & Neustadt, P.C.

(57) ABSTRACT

It is an object of the present invention to provide a control system capable of maintaining communication quality, decreasing transmission delay, and simultaneously connecting with numerous mobile stations 40 in a mobile packet communication system. The control system of the present invention controls the information rate of a shared channel (DSCH) in a mobile packet communication system for time-division multiplexing and transmitting data signals addressed to a plurality of mobile stations 40 through a shared channel (DSCH) and transmitting control signals addressed to the mobile stations through dedicated channels (A-DPCHs). The control system is provided with a dedicated channel number monitoring unit 25 for monitoring a change in the number of dedicated channels (number of simultaneously connected A-DPCHs) and an information rate controlling unit 24 for controlling the information rate of the shared channel (DSCH) according to the detection result when a change in the number of dedicated channels (number of simultaneously connected A-DPCHs) is detected.

15 Claims, 10 Drawing Sheets

FOREIGN PATENT DOCUMENTS

| | | |
|---|---|---|
| JP | 2000-101680 | 4/2000 |
| JP | 2000-217144 | 8/2000 |
| JP | 2002-521886 | 7/2002 |
| WO | WO 00/04728 | 1/2000 |
| WO | WO 01/47146 | 6/2001 |
| WO | WO 01/56175 A1 | 8/2001 |
| WO | WO 01/78324 A1 | 10/2001 |

* cited by examiner

FIG.4

| NUMBER OF SIMULTANEOUSLY CONNECTED A-DPCHs | INFORMATION RATE |
|---|---|
| $N_1$ OR MORE BUT LESS THAN $N_2$ | $R_1$ Kbps |
| $N_2$ OR MORE BUT LESS THAN $N_3$ | $R_2$ Kbps |
| $N_3$ OR MORE BUT LESS THAN $N_4$ | $R_3$ Kbps |
| $N_4$ OR MORE BUT LESS THAN $N_5$ | $R_4$ Kbps |
| $N_5$ OR MORE | $R_5$ Kbps |

FIG.5

| ITEM | VALUE |
|---|---|
| PRESENT INFORMATION RATE | $R_2$ Kbps |
| NUMBER OF SIMULTANEOUSLY CONNECTED A-DPCHs | P |

FIG.8

| USER ID | INFORMATION RATE | CONTROL EXECUTION FREQUENCY | NUMBER OF TRANSMISSION BLOCKS | NUMBER OF ERROR BLOCKS | BLOCK ERROR RATE | AVERAGE VALUE OF A-DPCH TRANSMISSION POWER |
|---|---|---|---|---|---|---|
| 1 | 64 Kbps | 3 | 703 | 144 | 20% | 23.5 dBm |
| 2 | 128 Kbps | 2 | 864 | 63 | 7% | 15.5 dBm |
| 3 | 384 Kbps | 0 | 45 | 0 | 0% | 18.3 dBm |
| 4 | 256 Kbps | 1 | 110 | 5 | 5% | 10.1 dBm |
| 5 | 384 Kbps | 0 | 281 | 34 | 12% | 12.8 dBm |

CONTROL SYSTEM, CONTROL METHOD, AND RADIO NETWORK CONTROLLER PREFERABLY USED FOR THE SYSTEM AND METHOD

CROSS REFERENCE TO RELATED APPLICATIONS

This application is based upon and claims the benefit of priority from the prior Japanese Patent Applications No. P2001-338446, filed on Nov. 2, 2001, the entire contents of which are incorporated herein by reference.

BACKGROUND OF THE INVENTION

1. Field of the Invention

The present invention relates to a control system and control method for controlling an information rate in a mobile communication system and a radio network controller preferably used for the control system and control method.

Particularly, the present invention relates to a control system and control method for controlling the information rate of downlink in a mobile packet communication system and a radio network controller preferably used for the control system and control method.

2. Description of the Related Art

A conventional mobile packet communication system addresses time-division multiplexed data signals to a plurality of users (mobile stations) on a single radio channel (hereafter referred to as a channel) and transmits the data signals to the users from a viewpoint of the efficiency of frequency utilization, delay tolerance in packet communication, and the saving of code resources in downlink.

FIG. 1 shows a channel configuration for a conventional packet communication system specified in 3GPP (Third Generation Partnership Project).

The channel configuration shown in FIG. 1 uses a downlink shared channel (DSCH) for time-division multiplexing and transmitting data signals addressed to mobile stations $40_1$ and $40_2$ through downlink.

The channel configuration shown in FIG. 1 uses an associated dedicated physical channel (A-DPCH) for transmitting control signals addressed to the mobile stations $40_1$ and $40_2$ through downlink.

Moreover, the channel configuration shown in FIG. 1 uses a dedicated physical channel (DPCH) for transmitting both data signals and control signals addressed to the mobile stations $40_1$ and $40_2$ in uplink because the possibility of exhaustion of code resources is very low in uplink and the necessity, for using a shared channel such as a DSCH is low.

In this case, A-DPCH-1 and A-DPCH-2 are dedicated channels for a base station 30 to transmit a control signal to the mobile stations $40_1$ and $40_2$ respectively, which are always transmitted through code division multiplexing using codes different for each of the mobile stations $40_1$ and $40_2$.

Moreover, the DSCH is a shared channel for the base station 30 to transmit data signals to the mobile stations $40_1$ and $40_2$ and is always transmitted through code-division multiplexing for changing the transmission timing for each of the mobile stations $40_1$ and $40_2$ by using the same code.

In this case, to transmit data signals from the network (base station 30) to the mobile station $40_1$ or $40_2$ by using a DSCH, the message "a DSCH is transmitted" is previously notified to the mobile station $40_1$ or $40_2$ through the radio frame of an A-DPCH before the radio frame of the DSCH.

Then, the mobile station $40_1$ or $40_2$ receiving the above notice starts receiving the DSCH only when it is determined that the DSCH is coming.

By using the above system, the base station 30 can freely change the mobile stations $40_1$ and $40_2$ for transmitting data signals by using the DSCH.

In FIG. 1, the A-DPCH-1 and A-DPCH-2 and the DSCH are set as downlinks. However, the DSCH is not always set but it is set only when the above notice is received through the A-DPCH-1 or A-DPCH-2.

Because the DSCH is discretely transmitted on a time basis, it is impossible to apply closed-loop transmission power control to the DSCH. Therefore, closed-loop transmission power control is applied to the temporally-continuous A-DPCH or DPCH and the transmission power of the DSCH is controlled so as to interlock with the transmission power of the A-DPCH with a predetermined offset which is previously decided by a telecommunication operator.

For example, when the transmission power of the A-DPCH-1 addressed to the mobile station 401 is 20 dBm at the time t and the DSCH is transmitted to the mobile station $40_1$ at the time t, the transmission power of the DSCH addressed to the mobile station $40_1$ at the time t becomes 30 dBm if the above offset is equal to 10 dBm.

Moreover, for example, when the transmission power of the A-DPCH-2 addressed to the mobile station $40_2$ is 22 dBm at the time t+1, the transmission power of the DSCH addressed to the mobile station $40_2$ at the time t+1 similarly becomes 32 dBm.

Furthermore, in the case of a conventional mobile packet system specified in 3GPP, the information rate of the DSCH can be changed at every transmission time interval (TTI) at each of mobile stations $40_1$ and $40_2$.

However, it is unknown what can be used as a trigger to change an information rate of the DSCH at present, and an information rate set at start of communication is not changed after the start of the communication.

In general, it is a problem for a mobile packet communication system to maintain communication quality, decrease transmission delay (increase an information rate), and simultaneously connect with numerous mobile stations 40 (house more users). In this case, it is known that an information rate is proportional to a transmission power.

That is, it is known that when a higher information rate is necessary, a larger transmission power is necessary and when communication is performed at a low information rate, only a small transmission power is necessary.

In the case of a conventional mobile packet communication system, however, because the information rate of the DSCH is a fixed information rate and the A-DPCH is a dedicated channel for code-division-multiplexing a control signal addressed to each mobile station 40, a system capacity is pressured due to the increase in the transmission power or the number of code resources consumed by the A-DPCH when the number of mobile stations 40 simultaneously connected increases.

Therefore, a problem occurs in that it is difficult to maintain communication quality and decrease transmission delay.

To solve the above problem, a mechanism is known which maintains communication quality of the whole mobile packet communication system and decreases transmission delay by observing the transmission power and the number of code resources consumed by the A-DPCH when admitting a connection request from a new mobile station 40.

The above mechanism does not admit the connection request from the new mobile station 40 when either of the transmission power and the number of code resources is almost exhausted.

However, the above mechanism has a problem that it cannot connect with numerous mobile stations 40 (cannot house more users) at the same time though it is preferable not to reject connection requests from new mobile stations 40 as far as possible.

BRIEF SUMMARY OF THE INVENTION

Thus, the present invention is made to solve the above problems and its object is to provide a control system and a control method making it possible to maintain communication quality, decrease transmission delay, and simultaneously connect numerous mobile stations 40 (house more users) by dynamically controlling, according to the number of connected A-DPCHs, the information rate of the DSCH addressed to each mobile station 40 in a mobile packet communication system for time-division multiplexing and transmitting data signals addressed to a plurality of mobile stations 40 to a single channel (DSCH) and making the transmission power of the DSCH interlock with the transmission power of an A-DPCH with a predetermined offset.

The first aspect of the present invention is a control system for controlling the information rate of a shared channel in a mobile packet communication system for multiplexing and transmitting data signals addressed to a plurality of mobile stations through the shared channel and transmitting the control signal addressed to each of the mobile stations through a dedicated channel comprising; a dedicated channel number monitoring unit for monitoring a change in the number of dedicated channels; and an information rate controlling unit for controlling the information rate of the shared channel according to the detection result when a change in the number of dedicated channels is detected.

In the case of the first aspect of the present invention, it is preferable that the information rate controlling unit preferentially controls the information rate of the shared channel of a specific mobile station according to the number of transmission errors of the data signals when a change in the number of dedicated channels is detected.

In the case of the first aspect of the present invention, it is preferable that the information rate controlling unit obtains the number of dedicated channels when a change in the number of dedicated channels is detected; calculates a target control frequency for controlling the information rate of the shared channel according to the obtained number of dedicated channels; calculates the total control execution frequency which is the total of control execution frequencies already having executed the control of the information rate of the shared channel in the mobile stations; divides the mobile stations into groups according to the control execution frequencies; selects a group having the highest control execution frequency and selects a mobile station having the smallest number of transmission errors in the selected group, when the total control execution frequency is larger than the target control frequency; selects a group having the lowest control execution frequency and selects a mobile station having the largest number of transmission errors in the selected group, when the total control execution frequency is smaller than a target control frequency; and controls the information rate of the shared channel for the selected mobile station.

In the case of the first aspect of the present invention, it is preferable that the information rate controlling unit preferentially controls the information rate of the shared channel of a specific mobile station according to the average value of transmission power of the dedicated channels in a predetermined period when a change in the number of dedicated channels is detected.

In the case of the first aspect of the present invention, it is preferable that the information rate controlling unit obtains the above number of dedicated channels when a change in the number of dedicated channels is detected; calculates a target control frequency for controlling the information rate of the shared channel according to the obtained number of dedicated channels; calculates the total control execution frequency which is the total of control frequencies already having executed the control of the information rate of the shared channel in the above mobile stations; divides the above mobile stations into groups according to the control execution frequencies; selects a group having the highest control execution frequency and selects a mobile station having the smallest average value of transmission power of the dedicated channels in the predetermined period in the selected group, when the total control execution frequency is higher than the target control frequency; selects a group having the lowest control execution frequency and selects a mobile station having the largest average value of transmission power of the dedicated channels in the predetermined period in the selected group, when the total control execution frequency is smaller than the target control frequency; and controls the information rate of the shared channel for the selected mobile station.

The second aspect of the present invention is a control method for controlling the information rate of a shared channel in a mobile packet communication system for multiplexing and transmitting data signals addressed to a plurality of mobile stations through the shared channel and transmitting a control signal addressed to each of the mobile stations through dedicated channels including the steps of; (a) monitoring a change in the number of dedicated channels; and (b) controlling the information rate of the shared channel according to the detection result when a change in the number of dedicated channels is detected.

In the case of the second aspect of the present invention, in the step (b), it is preferable to preferentially control the information rate of the shared channel of a specific mobile station according to the number of transmission errors of the data signals when a change in the number of dedicated channels is detected.

In the case of the second aspect of the present invention, it is preferable that the step (b) includes the steps of; (b1) obtaining the above number of dedicated channels when a change in the number of dedicated channels is detected; (b2) calculating a target control frequency for controlling the information rate of the shared channel according to the obtained number of dedicated channels; (b3) calculating the total control execution frequency which is the total of control execution frequencies already having executed the control of the information rate of the shared channel in the above mobile stations; (b4) dividing the above mobile stations into groups according to the control execution frequencies; (b5) selecting a group having the highest control execution frequency and selecting a mobile station having the smallest average value of transmission power of the dedicated channels in the predetermined period in the selected group, when the total control execution frequency is higher than a target control frequency; (b6) selecting a group having the lowest control execution frequency and selecting a mobile station having the largest average value of transmission power of the shared channel in the predetermined period in the selected group, when the total control execution frequency is lower than a target control frequency; and (b7) controlling the information rate of the shared channel for the selected mobile station.

In the case of the second aspect of the present invention, in the step (b), it is preferable to preferentially control the information rate of the shared channel of a specific mobile station according to the average value of transmission power of the dedicated channels in a predetermined period when a change in the number of dedicated channels is detected.

In the case of the second aspect of the present invention, it is preferable that the step (b) includes the steps of; (b11) obtaining the above number of dedicated channels when a change in the number of dedicated channels is detected; (b12) calculating a target control frequency for controlling the information rate of the shared channel according to the obtained number of dedicated channels; (b13) calculating the total control execution frequency which is the total of control execution frequencies already having executed the control of the information rate of the shared channel in the above mobile stations; (b14) dividing the mobile station into groups according to the control execution frequencies; (b15) selecting a group having the highest control execution frequency and selecting a mobile station having the smallest average value of transmission power of the dedicated channels in the predetermined period in the selected group, when the total control execution frequency is higher than a target control frequency; (b16) selecting a group having the lowest control execution frequency and selecting a mobile station having the largest average value of transmission power of the dedicated channels in the predetermined period in the selected group, when the total control execution frequency is lower than a target control frequency; and (b17) controlling the information rate of the shared channel for the selected mobile station.

The third aspect of the present invention is a radio network controller used for a mobile packet communication system for multiplexing and transmitting data signals addressed to a plurality of mobile stations through a shared channel and transmitting a control signal addressed to each of the mobile stations through each of dedicated channels comprising; a dedicated channel number monitoring unit for monitoring a change in the above number of dedicated channels; and an information rate controlling unit for controlling the information rate of the shared channel according to the detection result when a change in the number of dedicated channels is detected.

In the case of the third aspect of the present invention, it is preferable that the information rate controlling unit preferentially controls the information rate of the shared channel of a specific mobile station according to the number of transmission errors of the data signals when a change in the above number of dedicated channels is detected.

In the case of the third aspect of the present invention, it is preferable that the information rate controlling unit obtains the above number of dedicated channels when a change in the number of dedicated channels is detected; calculates a target control frequency for controlling the information rate of the shared channel according to the obtained number of dedicated channels; calculates the total control execution frequency which is the total of control execution frequencies already having executed the control of the information rate of the shared channel in the above mobile stations; divides the mobile stations into groups according to the control execution frequencies; selects a group having the highest control execution frequency and selects a mobile station having the smallest number of transmission errors in the selected group, when the total control execution frequency is higher than a target control frequency; selects a group having the lowest control execution frequency and selects a mobile station having the largest number of transmission errors in the selected group, when the total control execution frequency is lower than a target control frequency; and controls the information rate of the shared channel for the selected mobile station.

In the case of the third aspect of the present invention, it is preferable that the information rate controlling unit preferentially controls the information rate of the shared channel of a specific mobile station according to the average value of transmission power of the dedicated channels in a predetermined period when a change in the number of dedicated channels is detected.

In the case of the third aspect of the present invention, it is preferable that the information rate controlling unit obtains the above number of dedicated channels when a change in the number of dedicated channels is detected; calculates a target control frequency for controlling the information rate of the shared channel according to the obtained number of dedicated channels; calculates the total control execution frequency which is the total of control execution frequencies already having executed the control of the information rate of the shared channel in the above mobile stations; divides the mobile station into groups according to the control execution frequencies; selects a group having the highest control execution frequency and selects a mobile station having the smallest average value of transmission power of the dedicated channels in the predetermined period in the selected group, when the total control execution frequency is higher than a target control frequency; selects a group having the lowest control execution frequency and selects a mobile station having the largest average value of transmission power of the dedicated channels in the predetermined period in the selected group, when the total control execution frequency is lower than a target control frequency; and controls the information rate of the shared channel for the selected mobile station.

BRIEF DESCRIPTION OF THE SEVERAL VIEWS OF THE DRAWINGS

FIG. 4 is an illustration showing an equivalence table provided for an information rate control unit of a radio network controller of a control system of an embodiment of the present invention;

FIG. 5 is an illustration showing the contents stored in a memory of a radio network controller of a control system of an embodiment of the present invention;

FIG. 8 is an illustration showing the contents stored in a memory of radio network controller of a control system of an embodiment of the present invention;

DETAILED DESCRIPTION OF THE INVENTION (Configuration of Control System of Embodiment 1 of the Present Invention)

A configuration of a control system of embodiment 1 of the present invention is described below by referring to the accompanying drawings.

The control system of this embodiment controls the information rate of a downlink shared channel (DSCH) in a mobile packet communication system for multiplexing and transmitting data signals addressed to a plurality of mobile stations 40 through a downlink shared channel (DSCH) and transmitting a control signal addressed to each of the mobile stations 40 through an associated dedicated physical channel (A-DPCH).

Figure 1:
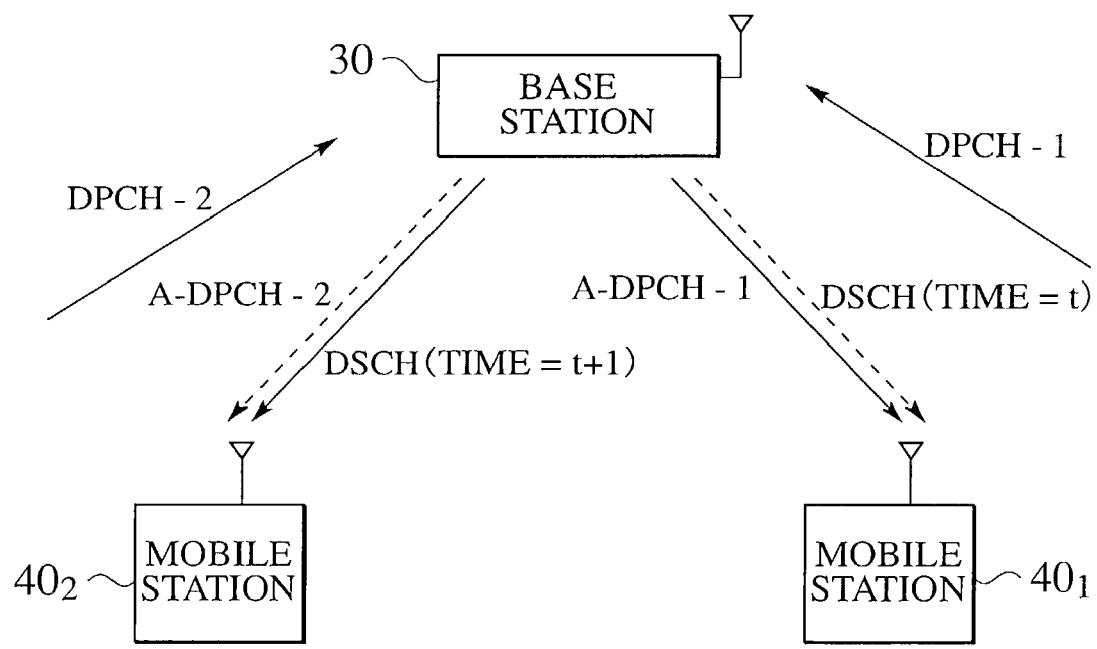
FIG. 1 is a schematic block diagram of a mobile packet communication system of a prior art.
Figure 2:
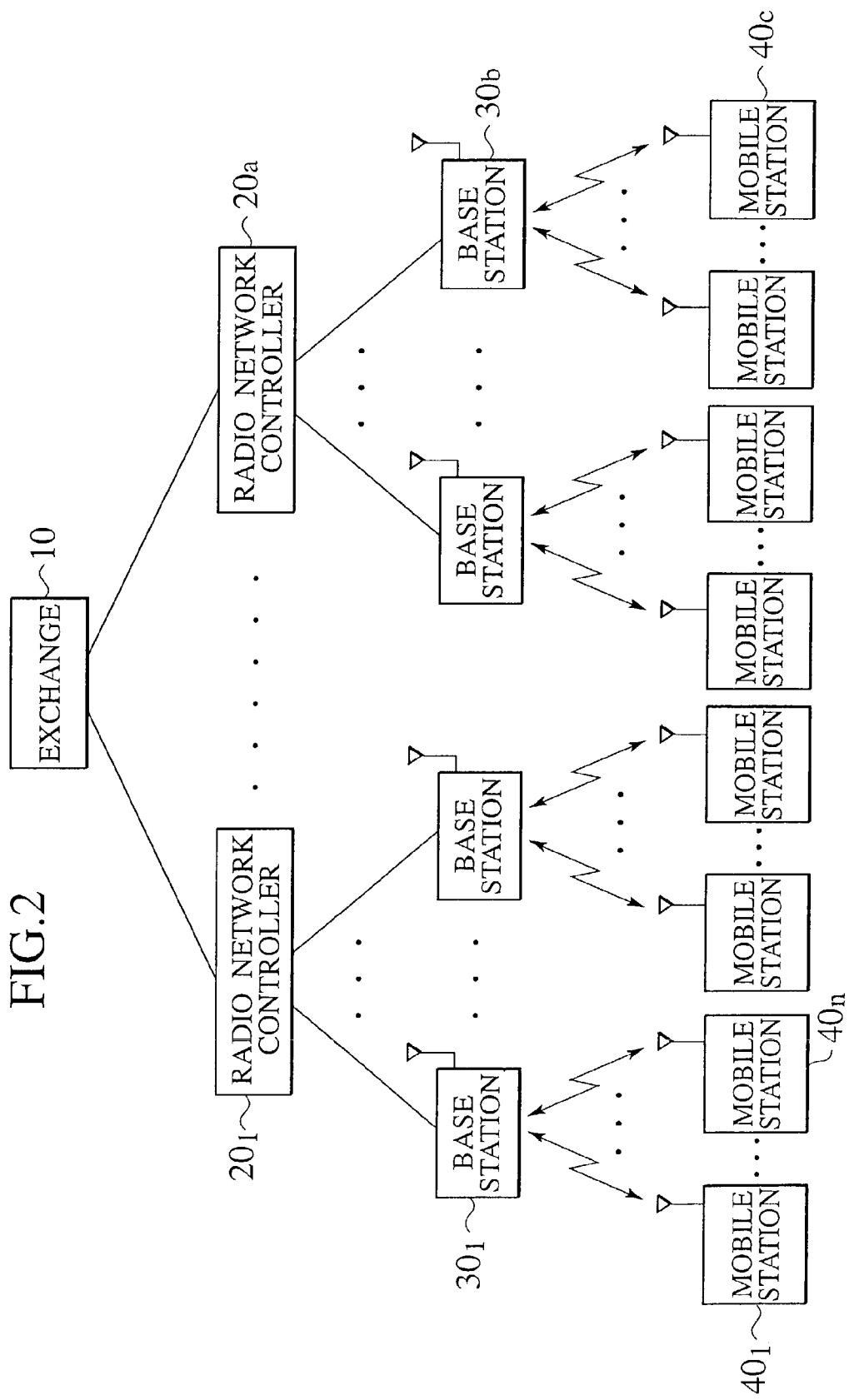
FIG. 2 is an illustration showing a configuration of the present embodiment.

FIG. 2 is an illustration showing a configuration of the mobile packet communication system of this embodiment. The configuration of the mobile packet communication system of this embodiment is the same as the configuration of a general mobile communication network.

As shown in FIG. 2, the mobile packet communication system of this embodiment is configured with an exchange 10, radio network controllers $20_1$ to $20_a$, base stations $30_1$ to $30_b$, and mobile stations $40_1$ to $40_c$ in the layered architecture.

The radio network controllers $20_1$ to $20_a$ have the same function, the base stations $30_1$ to $30_b$ have the same function, and the mobile stations $40_1$ to $40_c$ have the same function. Therefore, representatives (radio network controller 40, base station 30, and mobile station 40) of them are described below.

The exchange 10 is connected to the radio network controller 20 to exchange data signals.

The radio network controller 20 is connected to the exchange 10 and the base station 30 to control a plurality of base stations 30. For example the radio network controller 20 designates a predetermined offset value between transmission power of a DSCH and an A-DPCH and designates the information rate of the DSCH.

Each base station 30 performs radio communication (mobile packet communication) through a radio circuit between the base station 30 and mobile station 40.

Figure 3:
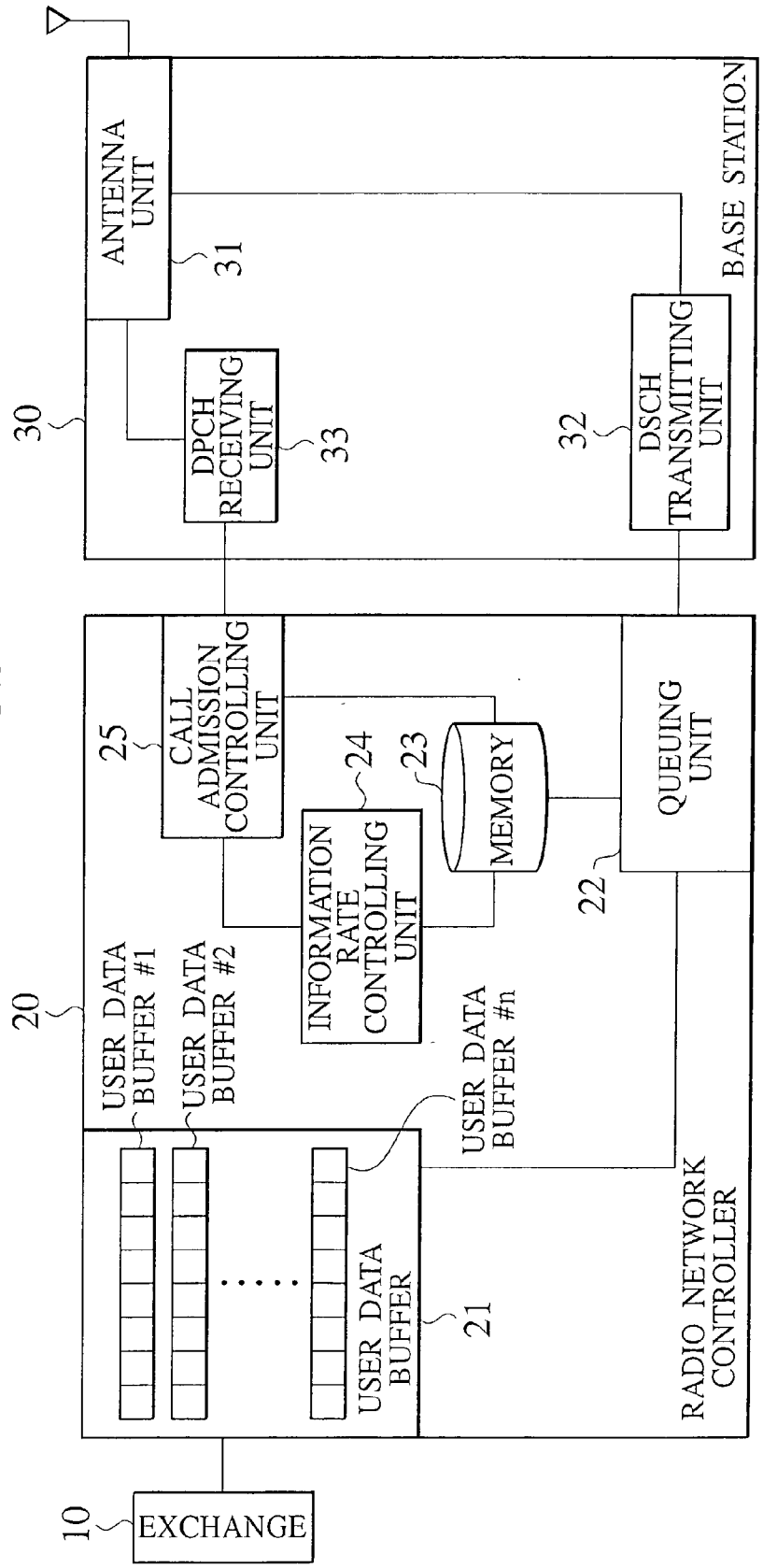
FIG. 3 is a functional block diagram of a radio network controller and a base station constituting a control system of an embodiment of the present invention.

FIG. 3 shows functional blocks of the radio network controller 20 and base station 30 constituting the control system of this embodiment.

As shown in FIG. 3, the radio network controller 20 is provided with a user data buffer 21, a queuing unit 22, a memory 23, an information rate controlling unit 24, and a call admission controlling unit 25.

In the case of this embodiment, the call admission controlling unit 25 constitutes a dedicated channel number monitoring unit for monitoring a change (an increase or a decrease) in the number of dedicated channels (number of simultaneously connected A-DPCHs).

Moreover, the information rate controlling unit 24 constitutes an information rate controlling unit for controlling the information rate of a downlink shared channel (DSCH) according to the detection result when a change in the number of dedicated channels (number of simultaneously connected A-DPCHs) is detected.

The user data buffer 21 is connected to the queuing unit 22, and temporarily stores data signals addressed to users (mobile stations $40_1$ to $40_n$) incoming from the exchange 10 and transmits the data signals to the queuing unit 22 according to a request from the queuing unit 22. The user data buffer 21 is constituted by user data buffers #1 to #n for the users (mobile stations $40_1$ to $40_n$).

The queuing unit 22 is connected to the user data buffer 21 and memory 23, selects users (mobile stations $40_1$ to $40_n$) according to a predetermined method, extracts data signals stored in the user data buffers #1 to #n for the selected users (mobile stations $40_1$ to $40_n$), and transfers the extracted data signals to the DSCH-transmitting unit 32 of the base station 30.

Moreover, the queuing unit 22 extracts a "present information rate (the set information rate)" from the memory 23 and transfers the extracted set information rate to the DSCH-transmitting unit 32 of the base station 30.

The memory 23 is connected to the information rate controlling unit 24 and the call admission controlling unit 25 to store a "present information rate" and "the number of simultaneously connected A-DPCHs".

FIG. 5 shows the contents stored in the memory 23. The "present information rate (the set information rate)" shows a presently set information rate of a DSCH. The "number of simultaneously connected A-DPCHs" shows the number of presently connected (presently-transmitted) A-DPCHs, that is, the number of presently connected users (mobile stations 40).

In FIG. 5, the "present information rate (the set information rate)" is equal to $R_2$ Kbps and the "number of simultaneously connected A-DPCHs" is equal to P.

The call admission controlling unit 25 is connected to the memory 23 and the information rate controlling unit 24, receives a call request and a disconnection request transmitted from the mobile station 40 via the base station 30, and determines whether or not to receive them.

When an admission determination result is rejection (negative), the call admission controlling unit 25 returns the message showing that the result is rejection to the mobile station 40.

When the admission determination result is permission (positive), the call admission controlling unit 25 increases the "number of simultaneously connected A-DPCHs" by 1. Moreover, when the admission determination result is permission (positive), the call admission controlling unit 25 notifies the information rate controlling unit 24 that the admission determination result is permission.

The information rate controlling unit 24 is connected to the memory 23 and the call admission controlling unit 25, and controls the information rate of a DSCH according to the notice showing that the admission determination result from the call admission controlling unit 25 is permission.

Specifically, the information rate controlling unit 24 has an equivalence table for relating the "number of simultaneously connected A-DPCHs" with the "information rate" (refer to FIG. 4).

The information rate controlling unit 24 extracts the "number of simultaneously connected A-DPCHs" from the memory 23 according to the notice showing that the admission determination result from the call admission controlling unit 25 is permission, retrieves the "information rate" corresponding to the "number of simultaneously connected A-DPCHs" according to the equivalence table shown in FIG. 4, and decides the retrieved "information rate" as an information rate $R_{tgt}$ newly set as the information rate of a DSCH.

In this case, the equivalence table shown in FIG. 4 is prepared so that the "information rate" decreases as the "number of simultaneously connected A-DPCHs" increases.

The information rate controlling unit 24 updates the "present information rate (the set information rate)" stored in the memory 23 according to an information rate $R_{tgt}$ newly set as the information rate of a DSCH.

The information rate controlling unit 24 of this embodiment equally controls the information rate s of DSCHs of all users (mobile stations 40).

As shown in FIG. 3, the base station 30 is provided with an antenna unit 31, a DSCH-transmitting unit 32, and a DPCH-receiving unit 33.

The antenna unit 31 is connected to the DSCH-transmitting unit 32 and DPCH-receiving unit 33. The antenna unit 31 transmits data signals output from the DSCH-transmitting unit 32 to the mobile stations 40 through a radio channel (DSCH). The antenna unit 31 receives data signals and control signals transmitted from the mobile stations 40 through a radio channel (DPCH).

The DSCH-transmitting unit 32 is connected to the antenna unit 31, receives data signals output from the queuing unit 22 of the radio network controller 20, converts the received data signals into a DSCH format, and transmits the data signals converted into the DSCH format via the antenna unit 31.

The DPCH-receiving unit 33 is connected to the antenna unit 31, receives data signals and control signals (including a call request and disconnection request) of a DPCH format from the antenna unit 31, converts the received data signals and control signals of the DPCH format into a format for the radio network controller 20, and transfers the converted format to the call admission controlling unit 25 of the radio network controller 20.

(Operations of Control System of This Embodiment)

Figure 6:
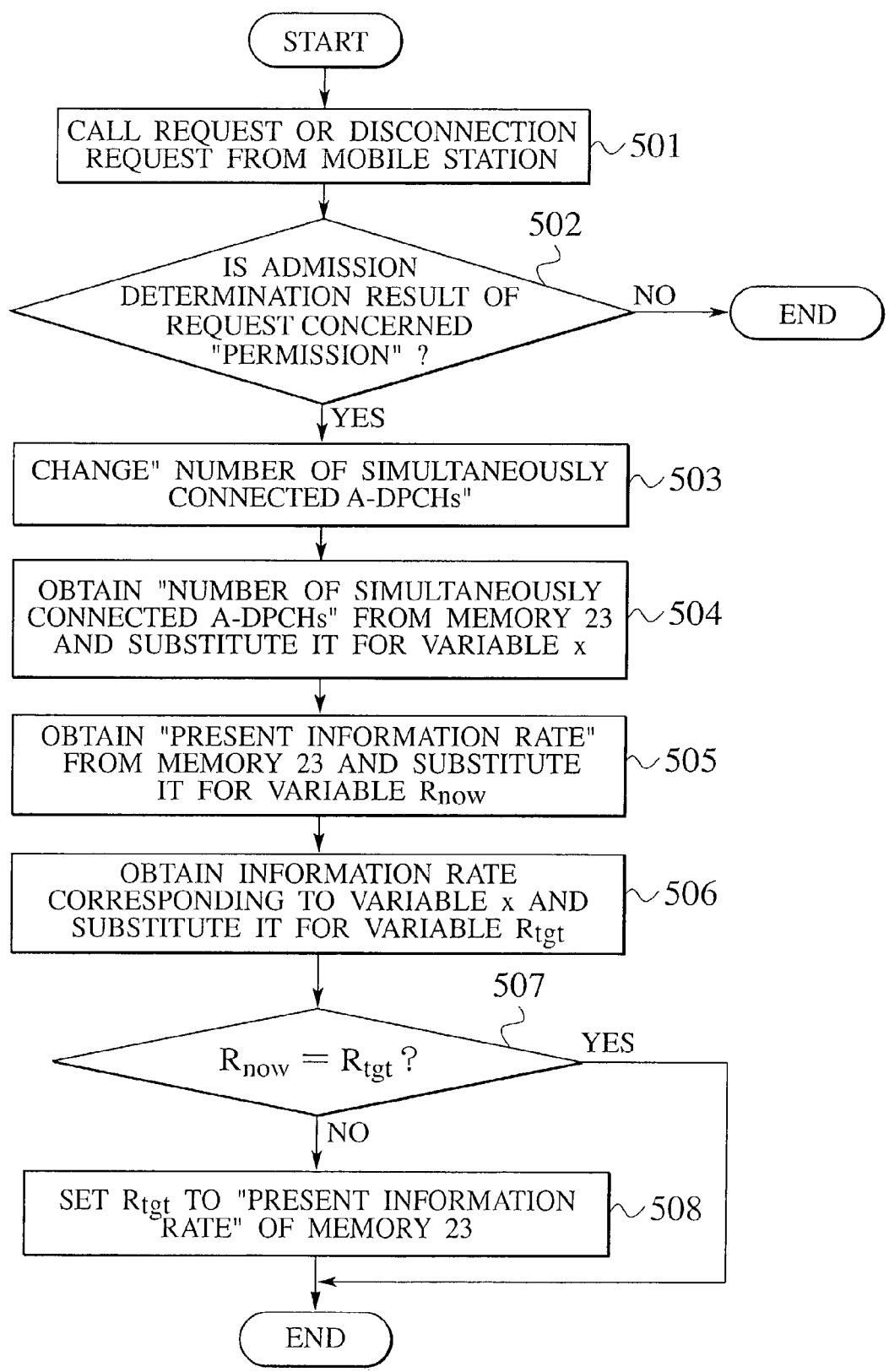
FIG. 6 is a flowchart showing operations for dynamically controlling the information rate of a DSCH in the control system of the present embodiment.

Operations of the control system constituting the above mentioned are described below by referring to FIG. 6. FIG. 6 is a flowchart showing operations for dynamically controlling the information rate of a DSCH in the control system of this embodiment.

As shown in FIG. 6, in step 501, the call admission controlling unit 25 of the radio network controller 20 receives a call request or a disconnection request from the mobile station 40 via the antenna unit 31 and the DPCH-receiving unit 33 of the base station 30.

In step 502, the call admission controlling unit 25 determines whether or not to admit the above request. When the admission determination result is rejection (negative), the call admission controlling unit 25 returns the message showing that the result is rejection to the mobile station 40 and this operation ends. Moreover, when the admission determination result is permission (positive), this operation advances to step 503.

In step 503, when the above request is a "call request", the call admission controlling unit 25 increases the "number of simultaneously connected A-DPCHs" stored in the memory 23 by 1. When the above request is a "disconnection request, the call admission controlling unit 25 decreases the "number of simultaneously connected A-DPCHs" stored in the memory 23 by 1. At the same time, the call admission controlling unit 25 notifies the information rate controlling unit 24 that it increases or decreases the "number of simultaneously connected A-DPCHs".

In step 504, the information rate controlling unit 24 of the radio network controller 20 obtains the "number of simultaneously connected A-DPCHs" from the memory 23 according to the notice from the call admission controlling unit 25 and substitutes the obtained "number of simultaneously connected A-DPCHs" for a variable X.

In step 505, the information rate controlling unit 24 obtains the "present information rate (the set information rate)" from the memory 23 and substitutes the obtained "present information rate (the set information rate)" for a variable $R_{now}$.

In step 506, the information rate controlling unit 24 obtains an "information rate" corresponding to the "number of simultaneously connected A-DPCHs (variable X)" according to the equivalence table shown in FIG. 4 and substitutes the obtained "information rate" for a variable $R_{tgt}$.

In Step 507, the information rate controlling unit 24 compares the "present information rate (variable Rnow)" with the information rate (variable $R_{tgt}$) newly set as the information rate of a DSCH".

When the "present information rate (variable $R_{now}$)" is equal to the "information rate (variable $R_{tgt}$) newly set as the information rate of a DSCH", this operation is completed.

When the "present information rate (variable $R_{now}$)" is different from the "information rate (variable $R_{tgt}$) newly set as the information rate of a DSCH", this operation advances to step 508.

In step 508, the information rate controlling unit 24 sets the "information rate (variable $R_{tgt}$) newly set as the information rate of a DSCU" to the "present information rate (the set information rate)" in the memory 23.

(Functions and Advantages of Control System of This Embodiment)

According to the control system of this embodiment, it is possible to maintain communication quality, suppress transmission delay, and simultaneously connect with numerous mobile stations 40.

(Configuration of Control System of Embodiment 2 of the Present Invention)

Figure 7:
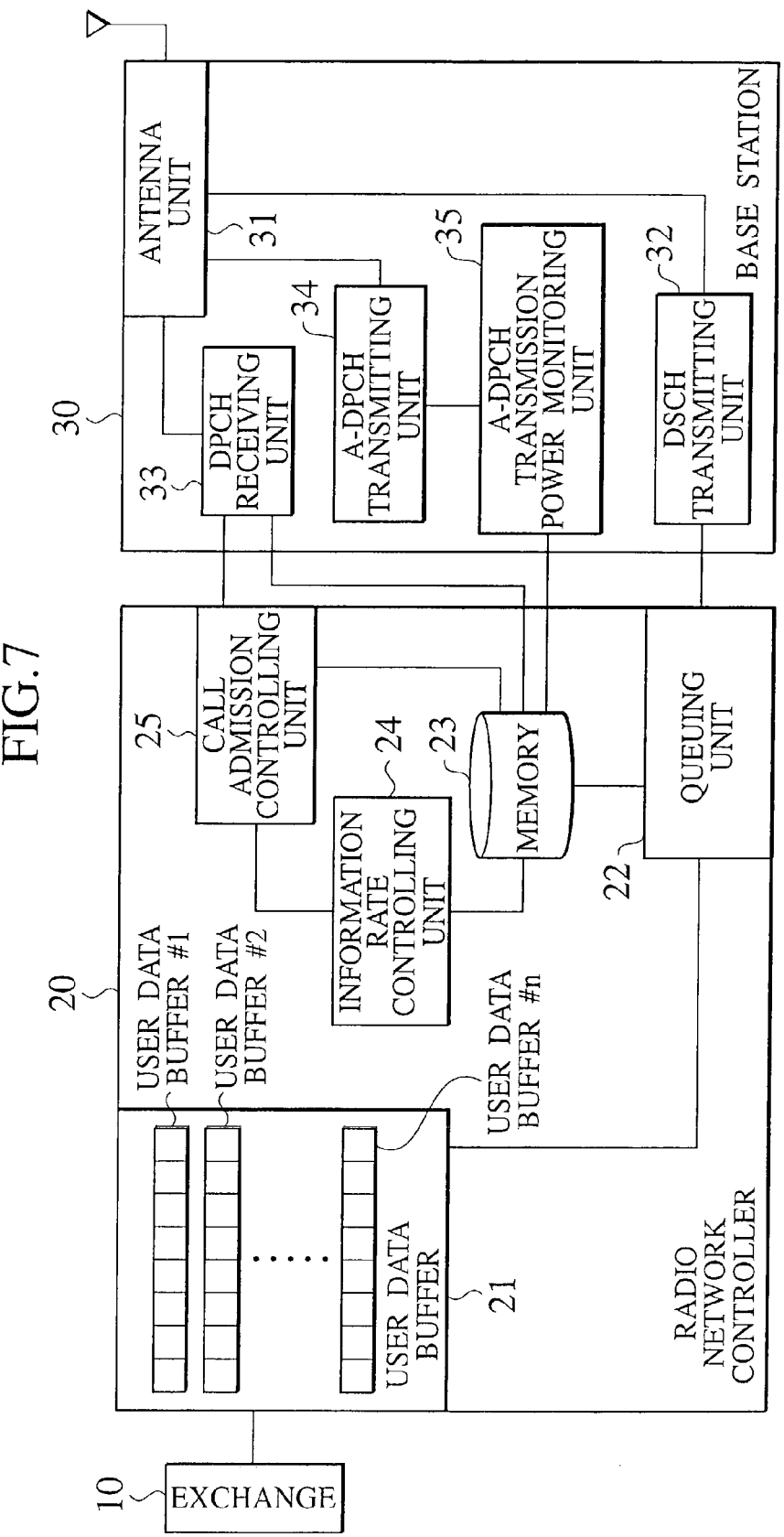
FIG. 7 is a functional block diagram of a radio network controller and a base station constituting a control system of an embodiment of the present invention.

A configuration of a control system of embodiment 2 of the present invention is described below by referring to the accompanying drawings. FIG. 7 shows the configuration of the control system of this embodiment.

As shown in FIG. 7, the configuration of the control system of this embodiment is the same as that of the control system of the above embodiment 1 except that a base station 30 is provided with an A-DPCH-transmitting unit 34 and A-DPCH transmission power monitoring unit 35. Differences in the control system of the embodiment 2 from the control system of the above embodiment 1 are described below.

As shown in FIG. 8, a memory 23 relates an "information rate", a "control execution frequency", a "number of transmission blocks", a "block err or rate", and an "average value of A-DPCH transmission power" to the "user ID" of each user (mobile station 40) and stores them.

In this case, the "information rate" shows the information rate of a DSCH addressed to each user (mobile station 40) presently set.

The "control execution frequency" is used to decide a frequency for changing the information rate of a DSCH addressed to each user (mobile station 40).

The "number of transmission blocks", the "number of error blocks", and the "block error rate" show the number of transmission blocks, number of error blocks, and block error rate of a DSCH or A-DPCH addressed to each user (mobile station 40) or a DPCH sent from each user (mobile station 40).

Furthermore, the "average value of A-DPCH transmission power" shows the average value of transmission power of an A-DPCH addressed to each user (mobile station 40).

A queuing unit 22 selects users (mobile stations $40_1$ to $40_n$) according to a predetermined method, extracts data signals from user data buffers #1 to #n for the selected users (mobile stations $40_1$ to $40_n$), and transfers the extracted data signals to the DSCH-transmitting unit 32 of the base station 30.

Moreover, the queuing unit 22 extracts the "information rate" for each user (mobile station 40) from the memory 23 and transfers the extracted information rate to the DSCH transmitting unit 32 of the base station 30.

When receiving a notice showing that an admission determination result is permission (positive) from a call admission controlling unit 25, an information rate controlling unit 24 controls the information rate of a DSCH addressed to each user mobile station 40).

When a change in the number of dedicated channels (number of simultaneously connected A-DPCHs) is detected, the information rate controlling unit 24 selects a mobile station 40 for preferentially controlling the information rate of a shared channel (DSCH) according to transmission errors of of data signals and preferentially controls the information rate of the shared channel (DSCH) for the selected mobile station.

Moreover, after the above control is completed, the information rate controlling unit 24 notifies the call admission controlling unit 25 that the control is completed.

As the number of simultaneously connected A-DPCHs increases, the information rate controlling unit 24 controls the information rate of a DSCH so as to preferentially lower an information rate starting with a user having the lowest communication quality, that is, the largest block error rate.

Moreover, as the number of simultaneously connected A-DPCHs decreases, the information rate controlling unit 24 controls the information rate of the DSCH so as to preferentially raise an information rate starting with a user having the highest communication quality, that is, the smallest block error rate.

Specifically, the information rate controlling unit 24 obtains the number of dedicated channels (number of simultaneously connected A-DPCHs); calculates a target control frequency (variable $\lambda$) for controlling the information rate of a shared channel (DSCH) according to the obtained number of dedicated channels (number of simultaneously connected A-DPCHs (variable $\lambda$); calculates the total control execution frequency (variable K) which is the total control execution frequencies already having executed the control of the information rate of a shared channel (DSCH) in a plurality of mobile stations 40; divides the mobile stations 40 into groups according to the control execution frequencies; selects a group having the highest control execution frequency and selects a mobile station 40 having the smallest number of transmission errors in the selected group, when the total control execution frequency (variable K) is higher than a target control frequency (variable $\lambda$); selects a group having the lowest control execution frequency, and selects a mobile station 40 having the largest number of transmission errors in the selected group, when the total control execution frequency (variable K) is lower than a target control frequency (variable $\lambda$); and controls the information rate of the shared channel (DSCH) for the selected mobile station 40.

The call admission controlling unit 25 receives a call request and a disconnection request from mobile stations 40 via the base station 30 and determines whether or not to admit the requests.

When the admission determination result is rejection (negative), the call admission controlling unit 25 returns the message showing that the result is rejection.

When the result is permission (positive), the call admission controlling unit 25 increases the "number of simultaneously connected A-DPCHs" stored in the memory 23 by 1.

Moreover, when the admission determination result is permission (positive), the call admission controlling unit 25 notifies the information rate controlling unit 24 that the result is permission.

Furthermore, when receiving the notice showing that "control is completed" from the information rate controlling unit 24, the call admission controlling unit 25 secures a region for storing the information for a corresponding user (mobile station 40) in the memory 23 and initializes the region with a predetermined initial value when the above request is a "call request".

The A-DPCH transmitting unit 34 of the base station 30 is connected to the antenna unit 31 and A-DPCH transmission power monitoring unit 35, and transmits the control signals addressed to each user via antenna unit 31.

The A-DPCH transmission power monitoring unit 34 of the base station 30 is connected to the memory 23 and the A-DPCH transmitting unit 34, constantly monitors the transmission power of an A-DPCH addressed to each user (mobile station 40) transmitted from the A-DPCH-transmitting unit 34, and stores the average value of A-DPCH transmission power in a predetermined period in the "average value of A-DPCH transmission power" for each user (mobile station 40) in the memory 23.

A DPCH-receiving unit 33 monitors the control signal from the mobile station 40, calculates a block error rate according to the information on the number of transmission blocks and the number of error blocks transmitted on the DSCH in the control signal, and stores the above number of transmission blocks, the number of error blocks, and the block error rate as the "number of transmission blocks", "number of error blocks", and "block error rate" in the memory 23 respectively.

(Operations of the Control System of This Embodiment)

Figure 9:
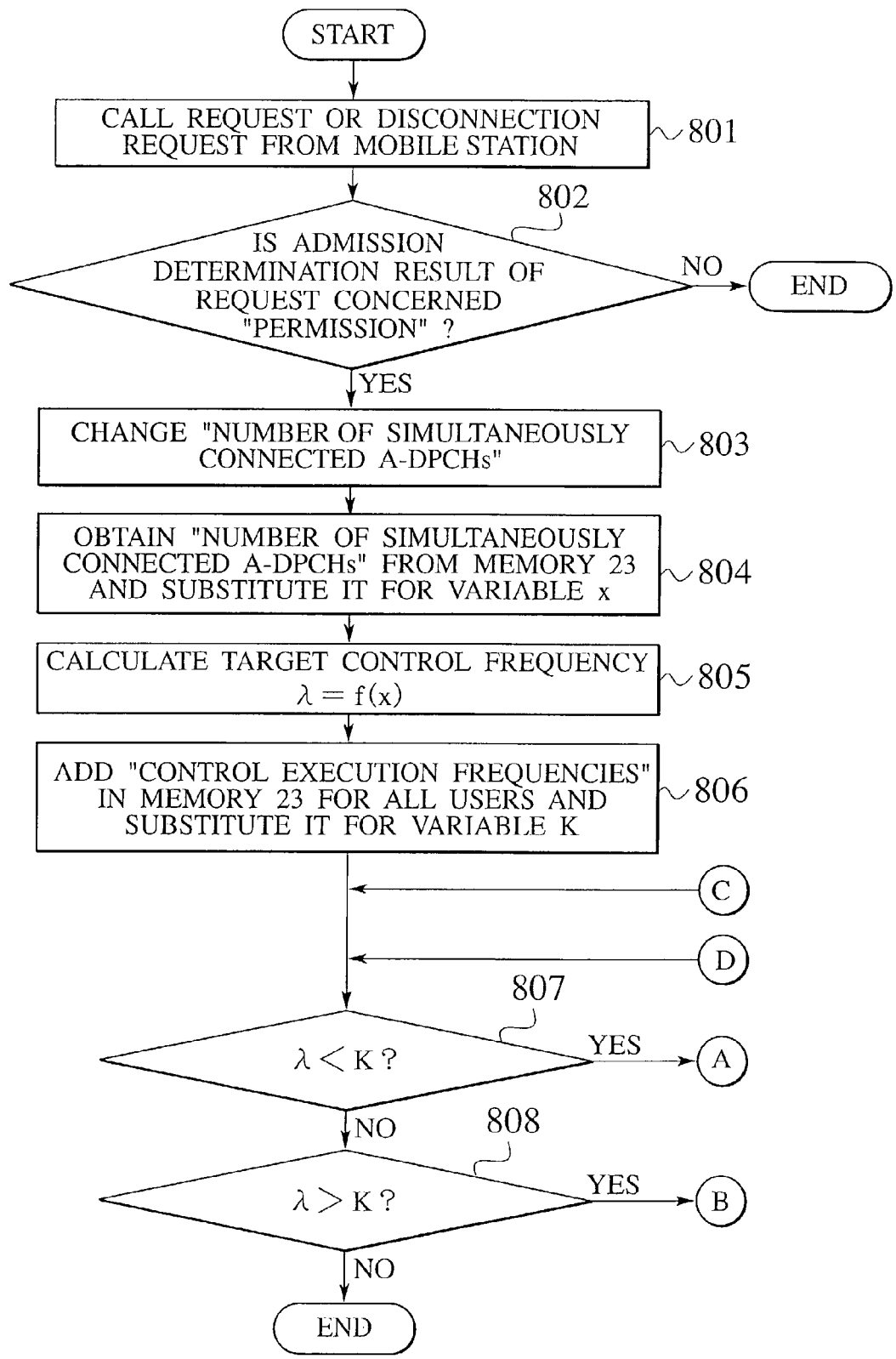
FIG. 9 is a flowchart showing operations for dynamically controlling the information rate of a DSCH in a control system of an embodiment of the present invention.
Figure 10:
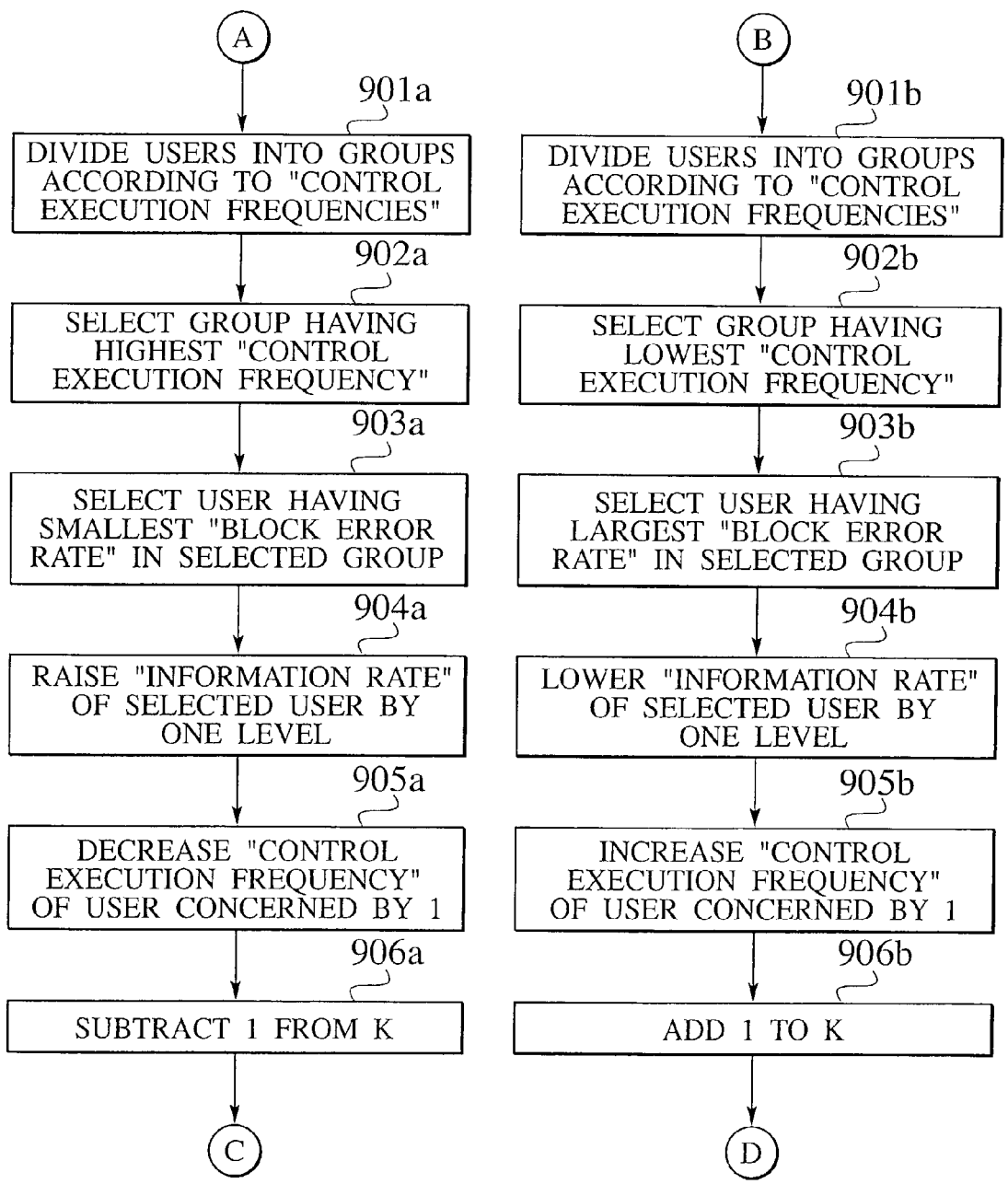
FIG. 10 is a flowchart showing operations for dynamically controlling the information rate of a DSCH in a control system of an embodiment of the present invention.

Operations of the control system of this embodiment are described below by referring to the accompanying drawings. FIGS. 9 and 10 are flowcharts showing operations for dynamically controlling the information rate of a DSCH in the control system of this embodiment.

As shown in FIG. 9, in step 801, call admission controlling unit 25 of the radio network controller 20 receives a call request or a disconnection request from the mobile station 40 via the antenna unit 31 and DPCH-receiving unit 33 of the base station 30.

In step 802, the call admission controlling unit 25 determines whether or not to receive the above request.

When the admission determination result is rejection (negative), the call admission controlling unit 25 returns the message showing that the result is rejection to the mobile station 40 and the above operation ends. When the admission determination result is permission (positive), the above operation advances to step 803.

In step 803, when the above request is a "call request", the call admission controlling unit 25 increases the "number of simultaneously connected A-DPCHs" stored in the memory 23 by 1.

When the above request is a "disconnection request", the call admission controlling unit 25 decreases the "number of simultaneously connected A-DPCHs" stored in the memory 23 by 1.

At the same time, the call admission controlling unit 25 notifies the information rate controlling unit 24 that it increases or decreases the "number of simultaneously connected A-DPCHs".

In step 804, the information rate controlling unit 24 of the radio network controller 20 calculates the number of "user IDs" stored in the memory 23 according to the notice from the call admission controlling unit 25 and substitutes the calculation result for a variable X as the "number of simultaneously connected A-DPCHs".

In step 805, the information rate controlling unit 24 calculates a target control frequency λ according to the variable X. The target control frequency λ is obtained by inputting the variable X to a predetermined function f(x). In this case, the predetermined function f(x) is an optional monotone increasing function in which an output value increases as an input value increases.

In step 806, the information rate controlling unit 24 adds the "control execution frequencies" of all users stored in the memory 23 and substitutes the addition result for a variable K.

In step 807, the information rate controlling unit 24 determines whether or not the target control frequency λ is smaller than the variable K. When the target control frequency λ is smaller than the variable K, the above operation advances to step 901a. In any other case, the operation advances to step 808.

In step 808, the information rate controlling unit 24 determines whether or not the target control frequency λ is larger than the variable K. When λ is larger than K, the above operation advances to step 901b. When λ is not larger than K, that is, λ is equal to K, the above operation ends.

As shown in FIG. 10, in step 901a, the information rate controlling unit 24 divides users (mobile stations 40) into groups according to control execution frequencies".

In the case of the example in FIG. 8, users are divided into a first group of a "control execution frequency=3" (user 1 having user ID=1), a second group of a "control execution frequency=2" (user 2 having user ID=2), a third group of a "control execution frequency=1" (user 4 having user ID=4), and a fourth group of a "control execution frequency=0" (user 3 having user ID=3 and user 5 having user ID=5).

In step 902a, the information rate controlling unit 24 selects a group of the highest "control execution frequency". In the case of the example in FIG. 8, the first group is selected.

In step 903a, the information rate controlling unit 24 selects a user (mobile station 40) having the smallest "number of block error rate" in the selected group. In the case of example in FIG. 8, user 1 is selected.

In step 904a, the information rate controlling unit 24 raises the "information rate" of the selected user (mobile station 40) by one level. In the case of example in FIG. 8, the "information rate" of the user 1 is raised by one level (e.g. from 64 Kbps to 128 Kbps).

In step 905a, the information rate controlling unit 24 lowers a "control execution frequency" of the selected user (mobile station 30). In the case of example in FIG. 8, the "control execution frequency" of the user 1 is decreased from "3" to "2".

In step 906a, the information rate controlling unit 24 subtracts 1 from the variable K. Then, the above operation returns to step 807.

In step 901b, the information rate controlling unit 24 divides users (mobile stations 40) according to "control execution frequencies".

In the case of example in FIG. 8, users are divided into a first group of a "control execution frequency=3" (user 1 having user ID=1), a second group of a "control execution frequency=2" (user 2 having user ID=2), a third group of a "control execution frequency=1" (user 4 having user ID=4), and a fourth group of a "control execution frequency=0" (user 3 having user ID=3 and user 5 having user ID=5).

In step 902b, the information rate controlling unit 24 selects a group of the lowest "control execution frequency". In the case of the example in FIG. 8, the fourth group is selected.

In step 903b, the information rate controlling unit 24 selects a user (mobile station 40) having the largest "block error rate" in the selected group. In the case of the example in FIG. 8, user 5 is selected.

In step 904b, the information rate controlling unit 24 lowers the "information rate" of the selected user (mobile station 40) by one level. In the case of the example in FIG. 8, the "information rate" of user 5 is lowered by one level (e.g. from 384 Kbps to 320 Kbps).

In step 905b, the information rate controlling unit 24 raises the "control execution frequency" of the selected user (mobile station 40) by one level. In the case of the example in FIG. 8, the "control execution frequency" of the user 5 is raised from "0" to "1".

In step 906b, the information rate controlling unit 24 adds 1 to the variable K. Then, the above operation returns to step 807.

(Functions and Advantages of Control System of This Embodiment)

According to the control system of this embodiment, the information rate controlling unit 24 preferentially controls the information rate of a DSCH of a specific mobile station 40 according to the block error rate of a data signal. Therefore, when the number of simultaneously connected A-DPCHs increases, the information rate of a DSCH for a mobile station 40 having low communication quality (large number of transmission errors) is lowered and when the number of simultaneously connected A-DPCHs decreases, the information rate of a DSCH for a mobile station 40 having high communication quality (small number of transmission errors) is raised. Thereby, it is possible to operate a mobile packet communication system more efficiently while maintaining communication quality.

(Configuration of Control System of Embodiment 3 of the Present Invention)

The configuration of a control system of embodiment 3 of the present invention is the same as that of the control system of the above embodiment 2. However, the function of the information rate controlling unit 24 is different from that of control system of the above embodiment 2.

The information rate controlling unit 24 of this embodiment preferentially controls the information rate of the shared channel (DSCH) of a specific mobile station 40 according to the average value of transmission power of dedicated channels (A-DPCHs) in a predetermined period when a change in the number of dedicated channels (number of simultaneously connected A-DPCHs) is detected.

Specifically, the information rate controlling unit 24 of this embodiment obtains the number of dedicated channels (number of simultaneously connected A-DPCHs); calculates a target control frequency (variable λ) for controlling the information rate of the shared channel (DSCH) according to the obtained number of dedicated channels (number of simultaneously connected A-DPCHs); calculates the total control execution frequency (variable K) which is the total control execution frequencies already having executed the control of the information rate of the shared channel (DSCH) in a plurality of mobile stations 40; divides the mobile stations 40 into groups according to control execution frequencies; selects a group having the highest control execution frequency and selects a mobile station 40 having the smallest average value of transmission power of dedicated channels (A-DPCHs) in a predetermined period in the selected group, when the total control execution frequency (variable K) is larger than a target control frequency (variable λ); selects a group having the lowest control execution frequency and selects a mobile station 40 having the largest average value of transmission power of dedicated channels (A-DPCHs) in a predetermined period in the selected group, when the total control execution frequency (variable K) is smaller than a target control frequency (variable λ); and controls the information rate of the shared channel (DSCH) for the selected mobile station 40.

(Operations of Control System of This Embodiment)

Operations of this embodiment are the same as those of the control system of the above embodiment 2 except that the information rate of a DSCJ is controlled according to the average value of transmission power of A-DPCHs addressed to users (mobile stations 40) instead of controlling the information rate of a DSCH according to the block error rate of each user (mobile station 40).

That is, among operations of the control system of this embodiment, operations in steps 801 to 808 are the same as those of the control system of the above embodiment 2. Operations of this embodiment that differ from those of the control system of the embodiment 2 are described below.

As shown in FIG. 9, in step 807, the information rate controlling unit 24 determines whether or not the target control frequency λ is smaller than the variable K.

When the target control frequency λ is smaller than the variable K, the above operation advances to step 1001a. In cases other than the above, the above operation advances to step 808.

In step 808, the information rate controlling unit 24 determines whether or not the target control frequency λ is larger than the variable K.

When the target control frequency λ is larger than the variable K, the above operation advances to step 1001b. In cases other than the above, that is, when the target control frequency λ is equal to the variable K, the above operation ends.

Figure 11:
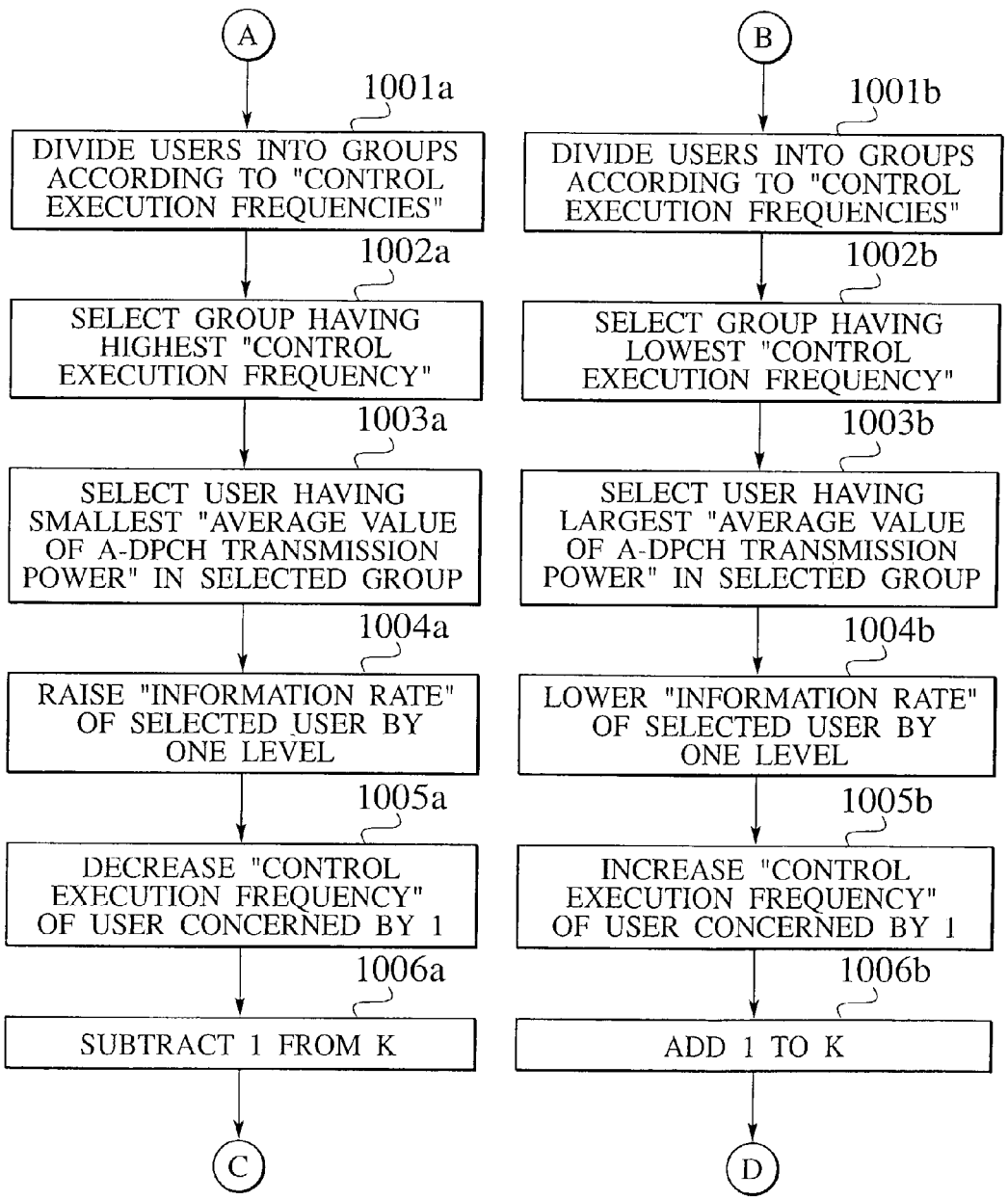
FIG. 11 is a flowchart showing operations for dynamically controlling the information rate of a DSCH in a control system of an embodiment of the present invention.

As shown in FIG. 11, in step 1001a, the information rate controlling unit 24 divides users (mobile stations 40) into groups according to "control execution frequencies".

In the case of the example in FIG. 8, users are divided into a first group of a "control execution frequency=3" (user 1 having user ID=1), a second group of a "control execution frequency=2" (user 2 having user ID=2), a third group of a "control execution frequency=1" (user 4 having user ID=4), and a fourth group of a "control execution frequency=0" (user 3 having user ID=3 and user 5 having user ID=5).

In step 1002a, the information rate controlling unit 24 selects a group having the highest "control execution frequency". In the case of the example in FIG. 8, the first group is selected.

In step 1003a, the information rate controlling unit 24 selects a user (mobile station 40) having the smallest "average value of transmission power of A-DPCHs in the selected group. In the case of the example in FIG. 8, the user 1 is selected.

In step 1004a, the information rate controlling unit 24 raises the "information rate" of the selected user (mobile station 40) by one level. In the case of the example in FIG. 8, the "information rate" of the user 1 is raised by one level (e.g. from 64 Kbps to 128 Kbps).

In step 1005a, the information rate controlling unit 24 lowers the "control execution frequency" of the selected user (mobile station 40) by 1. In the case of the example in FIG. 8, the "control execution frequency of the user 1 is lowered from "3" to "2".

In step 1006a, the information rate controlling unit 24 subtracts 1 from the variable K. Then, the above operation returns to step 807.

In step 1001b, the information rate controlling unit 24 divides users (mobile stations 40) into groups according to the "control execution frequencies".

In the case of the example in FIG. 8, users are divided into a first group of the "control execution frequency=3" (user 1 having user ID=1), a second group of the "control execution frequency=2" (user 2 having user ID=2), a third group of the "control execution frequency=1" (user 4 having user ID=4), and a fourth group of the "control execution frequency=0" (user 3 having user ID=3 and user 5 having user ID=5).

In step 1002b, the information rate controlling unit 24 selects a group having the smallest "control execution frequency". In the case of the example in FIG. 8, the fourth group is selected.

In step 1003b, the information rate controlling unit 24 selects the largest "average value of transmission power" of the selected user (mobile station 40). In the case of the example in FIG. 8, the user 3 is selected.

In step 1004b, the information rate controlling unit 24 increases the "information rate" of the selected user (mobile station 40) by one level. In the case of the example in FIG. 8, the "information rate" of the user 3 is lowered by one level (e.g. from 384 Kbps to 320 Kbps).

In step 1005b, the information rate controlling unit 24 increases the "control execution frequency" of the selected user (mobile station 40) by 1. In the case of the example in FIG. 8, the "control execution frequency" of the user 3 is increased from "0" to "1".

In step 1006b, the information rate controlling unit 24 adds 1 to the variable K. Then, the above operation returns to step 807.

(Functions and Advantages of Control System of This Embodiment)

According to the control system of this embodiment, the information rate controlling unit 24 preferentially controls the information rate of a DSCH of a specific mobile station 40 according to the average value of transmission power of A-DPCHs in a predetermined period.

Therefore, when the number of simultaneously connected A-DPCHs increases, the information rate of a DSCH for a mobile station 40 having a large average value of transmission power of the A-DPCHs in a predetermined period is lowered.

When the number of simultaneously connected A-DPCHs decreases, the information rate of a DSCH for a mobile station 40 having a small average value of transmission power of the A-DPCHs in a predetermined period is raised.

Thereby, it is possible to operate a mobile packet communication system more efficiently while maintaining communication quality.

As described above, the present invention can provide a control system and a control method making it possible to maintain communication quality, decrease transmission delay, and simultaneously connect with numerous mobile stations 40 (house more users) by dynamically controlling, according to the number of connected A-DPCHs, the information rate of a DSCH addressed to each mobile station 40 in a mobile packet communication system for time-division multiplexing and transmitting data signals addressed to a plurality of mobile stations 40 through a single channel (DSCH) and making the transmission power of a DSCH interlock with the transmission power of an A-DPCH with a predetermined offset.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concepts defined by the appended claims and their equivalents.

What is claimed is:

1. A control system for controlling the information rate of a shared channel in a mobile packet communication system for multiplexing and transmitting data signals addressed to a plurality of mobile stations through the shared channel and transmitting control signals addressed to the respective mobile stations through dedicated channels, comprising:
   a dedicated channel number monitoring unit for monitoring a change in a number of dedicated channels; and
   an information rate controlling unit for controlling the information rate of the shared channel according to the detection result when a change in the number of dedicated channels is detected.

2. The control system according to claim 1, wherein the information rate controlling unit preferentially controls the information rate of the shared channel of a specific mobile station according to the number of transmission errors of the data signals when a change in the number of dedicated channels is detected.

3. The control system according to claim 1, wherein the information rate controlling unit;
   obtains the number of dedicated channels when a change in the number of dedicated channels is detected
   calculates a target control frequency for controlling the information rate of the shared channel on the basis of the obtained number of dedicated channels,
   calculates a total control execution frequency which is the total of control execution frequencies already having executed the control of the information rate of the shared channel in the plurality mobile stations,
   divides the plurality of mobile stations into groups according to the control execution frequencies,
   selects a group having the highest control execution frequency and selects a mobile station having the smallest number of transmission errors in the selected group, when the total control execution frequency is higher than the target control frequency,
   selects a group having the lowest control execution frequency and selects a mobile station having the largest number of transmission errors in the selected group, when the total control execution frequency is lower than the target control frequency,
   controls the information rate of the shared channel for the selected mobile station.

4. The control system according to claim 1, wherein the information rate controlling unit preferentially controls the information rate of the shared channel of a specific mobile station according to the average value of transmission power of the dedicated channels in a predetermined period when a change in the number of dedicated channels is detected.

5. The control system according to claim 1, wherein the information rate controlling unit;
   obtains the number of dedicated channels when a change in the number of dedicated channels is detected,
   calculates a target control frequency for controlling the information rate of the shared channel on the basis of the obtained number of dedicated channels,
   calculates a total control execution frequency which is the total of control execution frequencies already having executed the control of the information rate of the shared channel in the plurality of mobile stations,
   divides the mobile stations into groups according to the control execution frequencies,
   selects a group having the highest control execution frequency and selects a mobile station having the smallest average value of transmission power of the dedicated channels in the predetermined period in the selected group, when the total control execution frequency is higher than the target control frequency,
   selects a group having the lowest control execution frequency and select a mobile station having the largest average value of transmission power of the dedicated channels in the predetermined period in the selected group, when the total control execution frequency is lower than the target control frequency, and
   controls the information rate of the shared channel for the selected mobile station.

6. A control method for controlling the information rate of a shared channel in a mobile packet communication system for multiplexing and transmitting data signals addressed to a plurality of mobile stations through the shared channel and transmitting control signals addressed to the respective mobile stations through dedicated channels, comprising the steps of:
   (a) monitoring a change in a number of dedicated channels; and
   (b) controlling the information rate of the shared channel according to the detection result when a change in the number of dedicated channels is detected.

7. The control method according to claim 6, wherein, in the step (b), the information rate of the shared channel of a specific mobile station is preferentially controlled according to the number of transmission errors of the data signals when a change in the number of dedicated channels is detected.

8. The control method according to claim 6, wherein the step (b) includes the steps of;
   (b1) obtaining the number of dedicated channels when a change in the number of dedicated channels is detected,
   (b2) calculating a target control frequency for controlling the infonnation rate of the shared channel on the basis of the obtained number of dedicated channels,
   (b3) calculating the total control execution frequency which is the total of control execution frequencies already having executed the control of the information rate of the shared channel in the mobile stations,
   (b4) dividing the plurality of mobile stations into groups according to the control execution frequencies, (b5) selecting a group having the highest control execution frequency and selecting a mobile station having the smallest number of transmission errors in the selected group, when the total control execution frequency is higher than the target control frequency, (b6) selecting a group having the lowest control execution frequency and selecting a mobile station having the largest number of transmission errors in the selected group, when the total control execution frequency is lower than the target control frequency, and (b7) controlling the information rate of the shared channel for the selected mobile station.

9. The control method according to claim 6, wherein, in the step (b), the information rate of the shared channel of a specific mobile station is preferentially controlled according to the average value of transmission power of the dedicated channels in a predetermined period when a change in the number of dedicated channels is detected.

10. The control method according to claim 6, wherein the step (b) includes the steps of;

(b11) obtaining the number of dedicated channels when a change of the number of dedicated channels is detected, (b12) calculating a target control frequency for controlling the information rate of the shared channel on the basis of the obtained number of dedicated channels, (b13) calculating the total control execution frequency which is the total of control execution frequencies already having executed the control of the information rate of the shared channel in the mobile stations, (b14) dividing the plurality of mobile stations into groups according to the control execution frequencies, (b15) selecting a group having the highest control execution frequency and selecting a mobile station having the smallest average value of transmission power of the dedicated channels in the predetermined period in the selected group, when the total control execution frequency is higher than the target control frequency, (b16) selecting a group having the lowest control execution frequency and selecting a mobile station having the largest average value of transmission power of the dedicated channels in the predetermined period in the selected group, when the total control execution frequency is lower than the target control frequency, and (b17) controlling the information rate of the shared channel for the selected mobile station.

11. A radio network controller used for a mobile packet communication system for multiplexing and transmitting data signals addressed to a plurality of mobile stations through a shared channel and transmitting control signals addressed to the respective mobile stations through dedicated channels, comprising:

a dedicated channel number monitoring unit for monitoring a change in a number of dedicated channels; and an information rate controlling unit for controlling the information rate of the shared channel according to the detection result when a change in the number of dedicated channels is detected.

12. The radio network controller according to claim 11, wherein the information rate controlling unit preferentially controls the information rate of the shared channel of a specific mobile station according to the number of transmission errors of the data signals when a change in the number of dedicated channels is detected.

13. The radio network controller according to claim 11, wherein the information rate controlling unit;

obtains the number of dedicated channels when a change of the number of dedicated channels is detected, calculates a target control frequency for controlling the information rate of the shared channel on the basis of the obtained number of dedicated channels, calculates the total control execution frequency which is the total of control execution frequencies already having executed the control of the information rate of the shared channel in the mobile stations, divides the plurality of mobile stations into groups according to the control execution frequencies, selects a group having the highest control execution frequency and selects a mobile station having the smallest number of transmission errors in the selected group, when the total control execution frequency is higher than the target control frequency, selects a group having the lowest control execution frequency and selects a mobile station having the largest number of transmission errors in the selected group, when the total control execution frequency is lower than the target control frequency, and controls the information rate of the shared channel for the selected mobile station.

14. The radio network controller according to claim 11, wherein the information rate controlling unit preferentially controls the information rate of the shared channel of a specific mobile station according to the average value of transmission power of the dedicated channels in a predetermined period when a change in the number of dedicated channels is detected.

15. The radio network controller according to claim 11, wherein the information rate controlling unit;

obtains the number of dedicated channels when a change in the number of dedicated channels is detected, calculates a target control frequency for controlling the information rate of the shared channel according to the obtained number of dedicated channels, calculates the total control execution frequency which is the total of control execution frequencies already having executed the control of the information rate of the shared channel in the mobile stations, divides the plurality of mobile stations into groups according to the control execution frequencies, selects a group having the highest control execution frequency and selects a mobile station having the smallest average value of transmission power of the dedicated channels in the predetermined period in the selected group, when the total control execution frequency is higher than the target control frequency, selects a group having the lowest control execution frequency and selects a mobile station having the largest average value of transmission power of the dedicated channels in the predetermined period in the selected group, when the total control execution frequency is lower than the target control frequency, and controls the information rate of the shared channel for the selected mobile station.

* * * * *